United States Patent [19]
Leibholz et al.

[11] Patent Number: 6,098,166
[45] Date of Patent: Aug. 1, 2000

[54] SPECULATIVE ISSUE OF INSTRUCTIONS UNDER A LOAD MISS SHADOW

[75] Inventors: Daniel Lawrence Leibholz, Cambridge; Sven Eric Meier, Boston; James Arthur Farrell, Harvard; Timothy Charles Fischer, Maynard, all of Mass.; Derrick Robert Meyer, Austin, Tex.

[73] Assignee: Compaq Computer Corporation, Houston, Tex.

[21] Appl. No.: 09/058,487

[22] Filed: Apr. 10, 1998

[51] Int. Cl.[7] ........................................ G06F 9/312
[52] U.S. Cl. ..................... 712/216; 712/215; 712/225; 714/48
[58] Field of Search ................................... 712/217, 218, 712/237, 238, 240, 200, 10, 210, 207, 216, 215, 225; 714/48

[56] References Cited

U.S. PATENT DOCUMENTS

| | | | |
|---|---|---|---|
| 5,075,844 | 12/1991 | Jardine et al. | 712/200 |
| 5,261,071 | 11/1993 | Lyon | 712/21 |
| 5,564,118 | 10/1996 | Steely, Jr. et al. | 395/375 |
| 5,615,350 | 3/1997 | Hesson et al. | 712/218 |
| 5,625,789 | 4/1997 | Hesson et al. | 712/217 |
| 5,666,506 | 9/1997 | Hesson et al. | 712/216 |
| 5,764,970 | 6/1998 | Rana et al. | 712/200 |
| 5,826,053 | 10/1998 | Witt | 712/210 |
| 5,884,061 | 3/1999 | Hesson et al. | 712/217 |
| 5,948,100 | 9/1999 | Hsu et al. | 712/238 |

OTHER PUBLICATIONS

Yeh, Tse–Yu, and Patt, Yale N., "Two–Level Adaptive Training Branch Prediction," Association for Computing Machinery, 0–89791–460–0/91/0011/0051.

Keller, Jim, "The 21264: A Superscalar Alpha Processor with Out–of–Order Execution," Digital Semiconductor, Digital Equipment Corp., Hudson, MA, no date given.

Gieseke, Bruce A., et al., "A 600 MHz Superscalar RISC Microprocessor With Out–of–Order Execution," Digital Semiconductor, Digital Equipment Corporation, Hudson, MA, no date given.

Gwennap, Linley, "Digital 21264 Sets New Standard," *Microprocessor Report*, 10(14) (Oct. 28, 1996).

Gieseke, Bruce A., et al., "FA 10.7: A 600 MHZ Superscalar RISC Microprocessor with Out–of–Order Execution." Paper presented at the *1997 IEEE International Solid–State Circuits Conference*, 0–7803–3721–2/97.

Emer, Joel, and Gloy, Nikolas, "A Language for Describing Predictors and Its Application to Automatic Synthesis," *Proceedings of the 24th Annual International Symposium on Computer Architecture*, Denver, CO Jun. 2–4, 1997.

Digtal 21264 Sets New Standard, by Linley Gwennap, Microprocessor Report, vol. 10, issue 14, Oct. 28, 1996.

*Primary Examiner*—Meng-Ai T. An
*Assistant Examiner*—Walter Benson
*Attorney, Agent, or Firm*—Hamilton, Brook, Smith & Reynolds, P.C.

[57] ABSTRACT

A technique for speculatively issuing instructions using an out-of-order processor. A cache miss by a load instruction results in either a reissue of all subsequently issued instructions for an integer instruction stream, or a reissue of only truly dependent instructions for a floating point instruction stream. One version of the technique involves issuing and executing a first instruction, and issuing a second instruction during a speculative time window of the first instruction that occurs after the first instruction is issued. The technique further involves executing the issued second instruction when the first instruction is executed in a first manner, and reissuing the second instruction and executing the reissued second instruction when the first instruction is executed in a second manner that is different than the first manner.

18 Claims, 9 Drawing Sheets

SPECULATIVE ISSUE OF INSTRUCTIONS UNDER A LOAD MISS SHADOW

FIELD OF THE INVENTION

This invention relates generally to data processing and in particular to instruction execution pipelining.

BACKGROUND OF THE INVENTION

Instruction pipelining involves splitting a data processor into a series of stages called a pipeline. The stages of the pipeline process multiple instructions of an instruction stream concurrently. For example, a fetch stage may fetch instructions, while an execution stage following the fetch stage simultaneously executes other previously fetched instructions. Due to the simultaneous nature of operation of the pipeline stages, processor resources are thus used more efficiently.

It is common for the instruction stream to include load instructions which, when executed, retrieve data from memory. To execute a load instruction, an instruction execution stage typically retrieves data from a data cache and an address tag from a table. The execution stage checks the retrieved tag to determine whether the retrieved data is valid. If the tag indicates that the data is valid (a cache hit), the load instruction is complete. If the tag indicates that the data is not valid (a cache miss), the execution stage retrieves the valid data from another level of memory (e.g., main memory or disk memory). A cache miss generally requires more time and processor resources than a cache hit since the execution stage must perform additional operations after the cache miss to retrieve the valid data.

The above-described load instruction may belong to a program and reside in memory with other program instructions. An instruction occurring after the load instruction may typically require the data retrieved by the load instruction. Such an instruction is called a dependent instruction because it depends on the data retrieved by a previous instruction. To guarantee correct execution of a dependent instruction, the processor must have valid data available before executing it.

Some in-order processors (processors which execute instructions in program order) delay execution of instructions that follow load instructions in order to guarantee correct execution of any dependent instructions. In particular, such processors issue a load instruction (i.e., provide the load instruction to an execution stage for execution), and then delay issuance of the next instruction in program order until the load instruction retrieves valid data. If the load instruction retrieves valid data from the data cache (a cache hit), the issue stage issues the next instruction immediately. If the load instruction retrieves invalid data from the data cache (a cache miss), the processor continues to delay issuance of the next instruction until the valid data is retrieved.

Other in-order processors issue instructions speculatively after a load instruction, before it is known whether the load instruction results in a cache hit or a cache miss. In particular, while the load instruction executes, such processors speculatively issue the next instruction in program order. If the load instruction results in a cache hit, the speculatively issued instruction executes as soon as the valid data is available. On the other hand, if the load instruction results in a cache miss, the speculatively issued instruction executes using the invalid data retrieved during the cache miss. Since this may cause the speculatively issued instruction to execute incorrectly the result of its execution is ignored. After the processor performs additional operations to eventually retrieve valid data, the processor reissues the instruction, i.e., the processor replays the instructions following the load instruction in program order. Since valid data has now been retrieved, the reissued instruction now executes correctly.

An in-order processor that delays instructions following a load instruction in program order sometimes uses processor resources rather inefficiently. In particular, the issue stage of the processor remains idle (i.e., delaying issuance of further instructions) while the execution stage determines whether data retrieved by the load instruction is valid. Furthermore, the execution stage remains idle (i.e., execution cycles go unused) while the issue stage issues instructions after valid data has been retrieved.

An in-order processor that speculatively issues instructions typically can use processor resources more efficiently than the in-order processor that delays instructions. In particular, the issue stage remains active by speculatively issuing the instructions while the execution stage determines whether data retrieved is valid. Additionally, in the case of a cache hit, the execution stage does not need to wait for instructions to be issued. Rather, the speculatively issued instructions are available for execution, and execution cycles continue to be utilized. Furthermore, the mechanism for handling a cache miss is relatively simple. In particular, when a cache miss occurs, the execution stage retrieves valid data from another level of memory, and the issue stage simply replays the instructions following the load instruction in program order. out-of-order processors attempt to use processor resources more efficiently than in-order processors by further minimizing unused processor cycles. In particular, when one or more processor cycles are about to go unused, an out-of-order processor can issue and execute one or more instructions out of program order so that processor cycles are not wasted.

SUMMARY OF THE INVENTION

Unfortunately, the technique of speculatively issuing instructions following a load instruction in program order, and reissuing those instructions in response to a cache miss, is not well suited for out-of-order processors. An out-of-order processor cannot simply reissue instructions following a load instruction in program order because some of the instructions following the load instruction may have issued and executed properly. Additionally, some of the instructions that occur earlier than the load instruction in program order may not have issued yet, and such instructions would be delayed further if the processor speculatively issued instructions following the load instruction in program order.

Furthermore, if the out-of-order processor simply reissued instructions following the load instruction in program order in response to a cache miss, the out-of-order processor's ability to issue and execute instructions out of program order would be defeated. Accordingly, the above-described speculative issue technique for in-order processors has heretofore been thought to not be well suited for out-of-order processors.

The present invention is directed to a technique for processing instructions in a data processor in which instructions may be issued out of program order. The technique involves issuing and executing a first instruction, and issuing a second instruction during a speculative time window of the first instruction that occurs after the first instruction is issued. The technique further involves executing the issued second instruction when the first instruction is executed in a first manner, and reissuing the second instruction, and executing the reissued second instruction when the first instruction is executed in a second manner that is different than the first manner.

Preferably, the first instruction is a load instruction such that executing the load instruction in the first manner involves retrieving valid data from a cache, and executing the load instruction in the second manner involves retrieving invalid data from the cache and subsequently retrieving valid data from a level of memory other than the cache. The second instruction may occur later in program order than the load instruction, and depend on the retrieved valid data. Alternatively, the second instruction may occur earlier in program order than the first instruction and be independent of the retrieved data.

The technique may further involve issuing an additional instruction during the speculative time window of the first instruction, executing the additional instruction when the first instruction is executed in the first manner, and reissuing the additional instruction and executing the reissued additional instruction when the first instruction is executed in the second manner. In one embodiment, the speculative time window of the first instruction is of a length corresponding to multiple processor cycles. As such, the additional instruction can be issued during a different processor cycle of the speculative time window of the first instruction than that of the second instruction.

The speculative time window of the first instruction may begin at least one processor cycle after the first instruction is issued. Accordingly, an additional instruction can be issued after the first instruction is issued and before the speculative time window of the first instruction begins. Preferably, this additional instruction is not reissued regardless of the manner in which the first instruction is executed.

The technique may further involve issuing and executing an additional instruction that accesses a predetermined memory location that includes hardcoded data. Here, a subsequent instruction issued during a speculative time window of the additional instruction is executed and not reissued, regardless of the manner in which the additional instruction is executed.

The technique may further involve identifying an occurrence of multiple cache misses when multiple load instructions are executed. After such occurrences are identified, the processor executes load instructions and delays issuance of dependent instructions during speculative time windows of the load instructions. That is, the speculative issue mechanism is essentially turned off such that there are no other instructions that are speculatively issued. Such operation is appropriate when multiple load instructions result in cache misses due to the absence of valid data in the cache.

Another embodiment of the invention is a technique that involves issuing and executing a first instruction, and issuing a second instruction during a speculative time window of the first instruction that occurs after the first instruction is issued. The technique further involves executing the issued second instruction when the second instruction is independent of the first instruction, or when the first instruction is executed in a first manner, and reissuing the second instruction and executing the reissued second instruction when the second instruction depends on the first instruction, and when the first instruction is executed in a second manner that is different than the first manner. Accordingly, when a first instruction such as a load instruction is executed in a particular manner (i.e., a cache miss), only dependent instructions issued within a speculative time window of the load instruction are reissued.

In one embodiment, the speculative time window is a single cycle in length.

Preferably, the first instruction is a load instruction that results in either a cache hit or a cache miss. If the second instruction is an independent instruction or the first instruction results in a cache hit, the processor does not reissue the second instruction. If the second instruction is a dependent instruction and the first instruction results in a cache miss, the second instruction is reissued.

The speculative issue mechanism in an out-of-order processor allows instructions that depend on loads to issue without waiting for a cache lookup to complete. Accordingly, processor resources are utilized more efficiently. Furthermore, instructions issued within speculative time windows remain queued to allow reissue with minimal latency in the case of a cache miss.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

The present invention is directed to a technique for issuing and executing a first instruction (e.g., a load instruction), and speculatively issuing a second instruction within a speculative time window of the first instruction using an instruction pipeline capable of issuing and executing instructions out of program order. When the first instruction is executed in a particular manner (e.g., when the load instruction retrieves invalid data during a cache miss), the processor reissues and executes the second instruction so that the second instruction executes properly (e.g., so that the second instruction, if dependent on the load instruction, uses valid data that is later retrieved by the load instruction after the cache miss).

Figure 1:
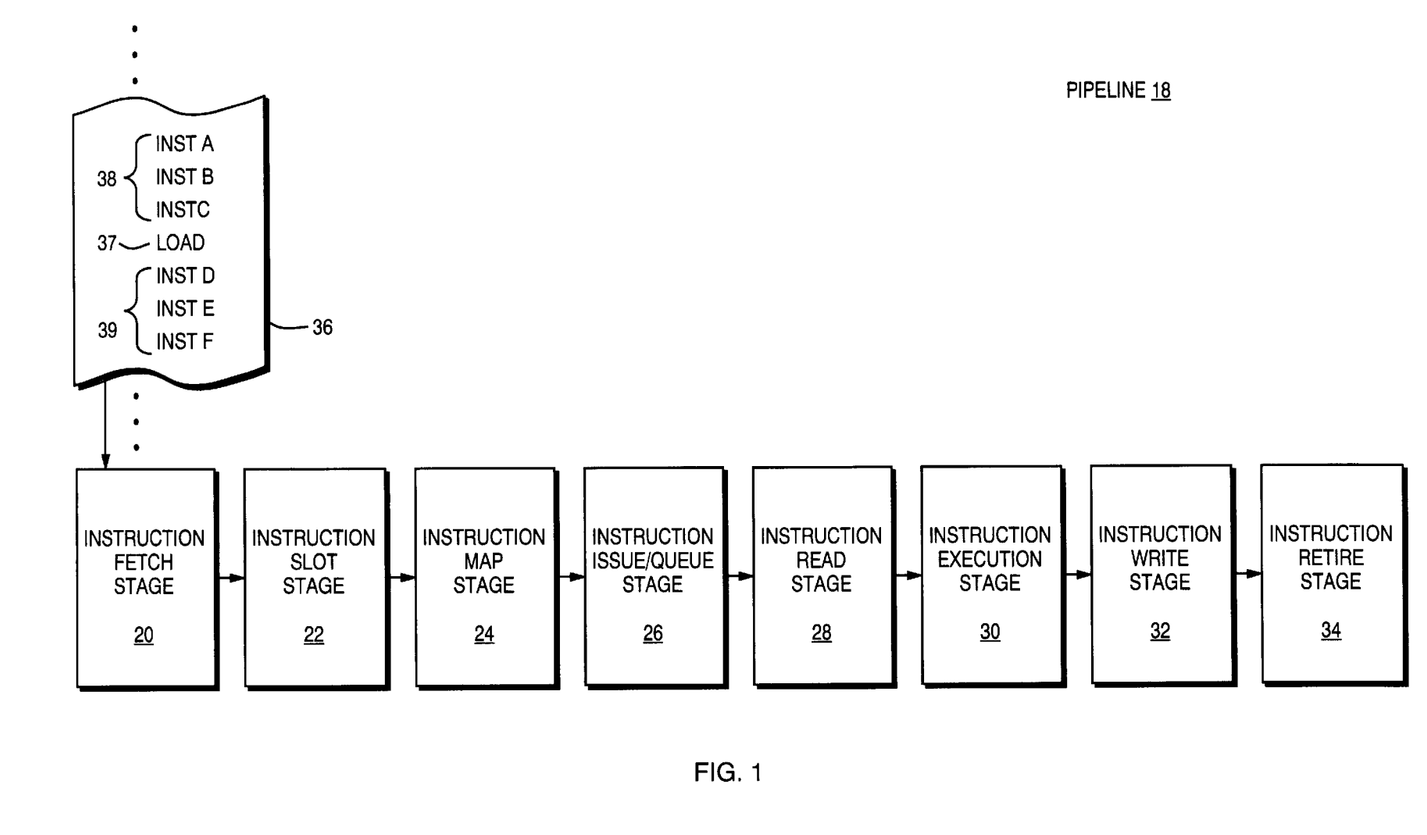
FIG. 1 is a block diagram of an instruction pipeline for a data processor in which the present invention may be used.

An instruction pipeline 18 that is suitable for the invention is shown in FIG. 1. The pipeline 18 includes an instruction fetch stage 20, an instruction slot stage 22, an instruction map stage 24, an instruction issue/queue stage 26, an instruction read stage 28, an instruction execution stage 30, an instruction write stage 32, and an instruction retire stage 34. The stages of the pipeline 18 process instructions that belong to a program 36 stored in memory. An exemplary program 36 includes a load instruction 37 (LOAD), instructions 38 (e.g., INST C) that occur earlier than the load instruction 37 in program order, and instructions 39 (e.g., INST D) that occur later than the load instruction 37 in program order.

An example of a load instruction 37 is:

LD X→R1.

An example of the instruction INST D is:

ADD R1+R2→R3.

The pipeline 18 is capable of processing instructions out of program order, and operates as follows. First, the instruction fetch stage 20 retrieves instructions of the program 36 from an instruction cache (not shown). Second, the instruction slot stage 22 determines to which one of several execution units the fetched instructions should be sent, e.g., a floating point unit or an integer unit (not shown). Third, the instruction map stage 24 maps virtual registers accessed by the instructions to physical general purpose registers (GPRs) in the processor. Fourth, the instruction issue/queue stage 26 queues and issues the instructions for execution. The issue order of the instructions may be different than the original program order. Fifth, the instruction read stage 28 reads data used by the instructions from the physical GPRs. Next, the instruction execution stage 30 executes the instructions in the order they were issued. Subsequently, the instruction write stage 32 stores results of the executed instructions into the physical GPRs. Finally, the instruction retire stage 34 retires the instructions by committing the processor state to the results of the operation.

The pipeline 18 is capable of issuing instructions within speculative time windows, and reissuing those instructions under certain situations. The concept of a speculative time window will now be described in further detail.

Figure 2:
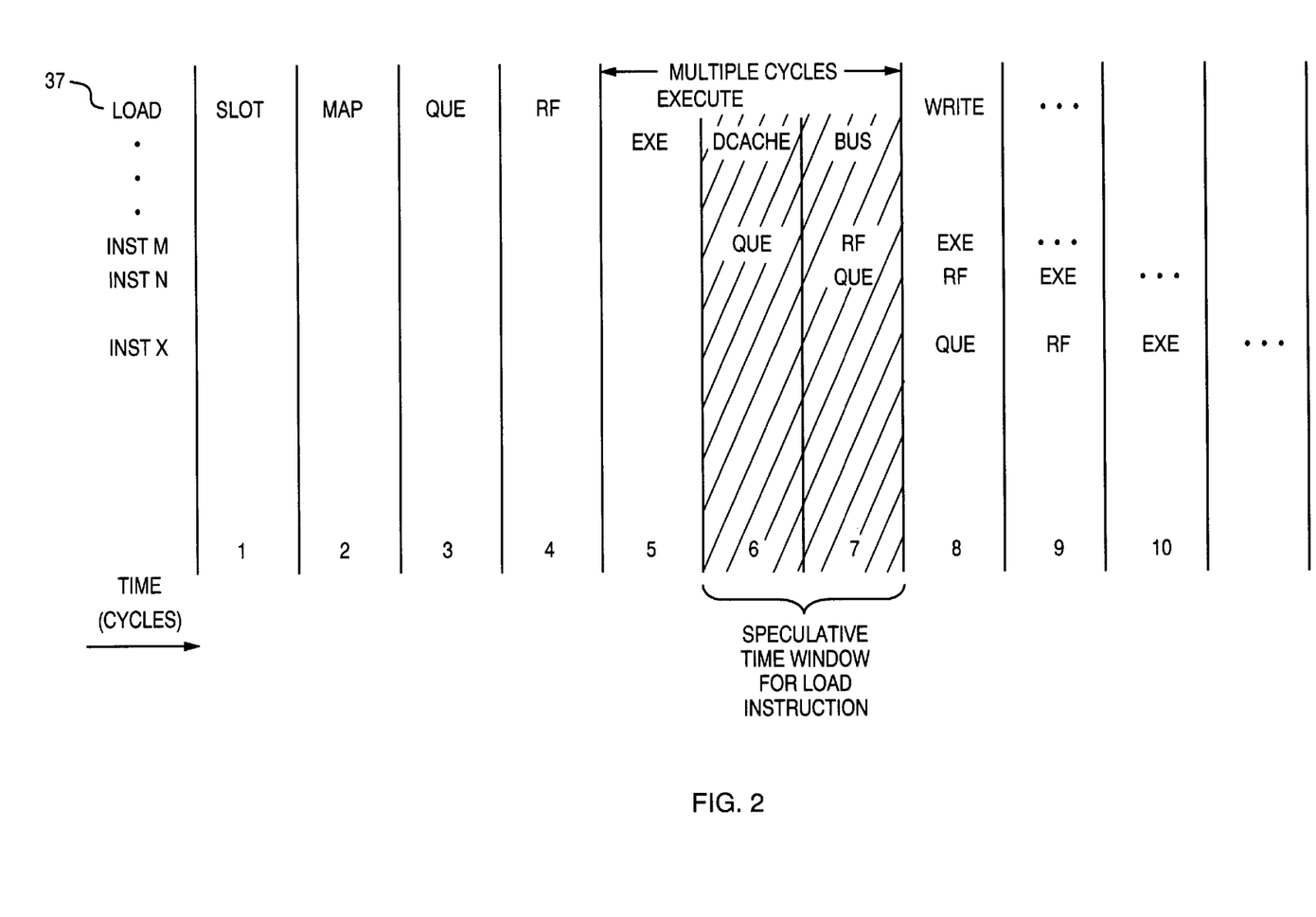
FIG. 2 is a timing diagram illustrating particular instructions that are processed simultaneously by the pipeline shown in FIG. 1.

FIG. 2 shows a pipeline timing diagram illustrating, by way of example, the simultaneous processing of multiple instructions. In particular, FIG. 2 shows a load instruction LOAD being slotted (SLOT) during cycle 1, being mapped (MAP) during cycle 2, being issued for execution (QUE) during cycle 3, reading data from a register file (RF) during cycle 4, executing (EXECUTE) during cycles 5–7, writing results to the register file (WRITE) during cycle 8, and so on. Execution of the load instruction LOAD involves computing a load address (EXE) during cycle 5, performing a data cache lookup (DCACHE) during cycle 6, and providing data retrieved from cache memory and determining whether the data is valid (BUS) during cycle 7. If the data is valid (a cache hit), the data is ready for use by another instruction in the very next cycle following the execution cycles, namely cycle 8. If the data is invalid (a cache miss), additional cycles are required to retrieve valid data from another level of memory.

FIG. 2 further shows three instructions that depend on valid data retrieved by the load instruction LOAD. In particular, an instruction INST M issues during cycle 6, reads data from the register file during cycle 7, executes using the valid data during cycle 8, and so on. Additionally, instruction INST N issues during cycle 7, reads data from the register file during cycle 8, executes using the valid data during cycle 9, and so on. Furthermore, instruction INST X issues during cycle 8, reads data from the register file during cycle 9, executes using the valid data during cycle 10, and so on.

If a processor were to issue the load instruction LOAD, and delay issuing a dependent instruction until it knows that the data retrieved by the load instruction LOAD is valid, the processor would delay issuing the subsequent instruction at least until cycle 8. That is, if the load instruction LOAD were to result in a cache hit, a dependent instruction could be issued in cycle 8. INST X is an example of such a dependent instruction. INST X issues (QUE) in cycle 8, but does not use the valid data (EXE) until cycle 10. Unfortunately, the valid data, although available for use in cycle 8, is left unused for two cycles (cycles 8 and 9).

Cycles 6 and 7 are considered to be a speculative time window for the load instruction LOAD. A dependent instruction that issues during this window issues before it is known whether the load instruction LOAD results in a cache hit or a cache miss, but late enough so that, in the case of a cache hit, the instruction does not need to wait for valid data to become available. INST M and INST N are instructions that issue within the speculative time window of the load instruction LOAD (i.e., issue during cycles 6 or 7). In particular, INST M issues in cycle 6 and executes in cycle 8, the first cycle in which the valid data is available. INST N issues in cycle 7 and executes in cycle 9, only one cycle after the first cycle in which the valid data is available. It typically does not make sense to speculatively issue a dependent instruction before the speculative time window (e.g., in cycles 4 or 5) because the dependent instruction would then need to wait until at least cycle 8 to execute using valid data. Similarly, it typically does not make sense to speculatively issue a dependent instruction after cycle 7 since by then it would be known whether the retrieved data is valid, and the instruction could be issued non-speculatively or be delayed depending on the data's validity.

Figure 3:
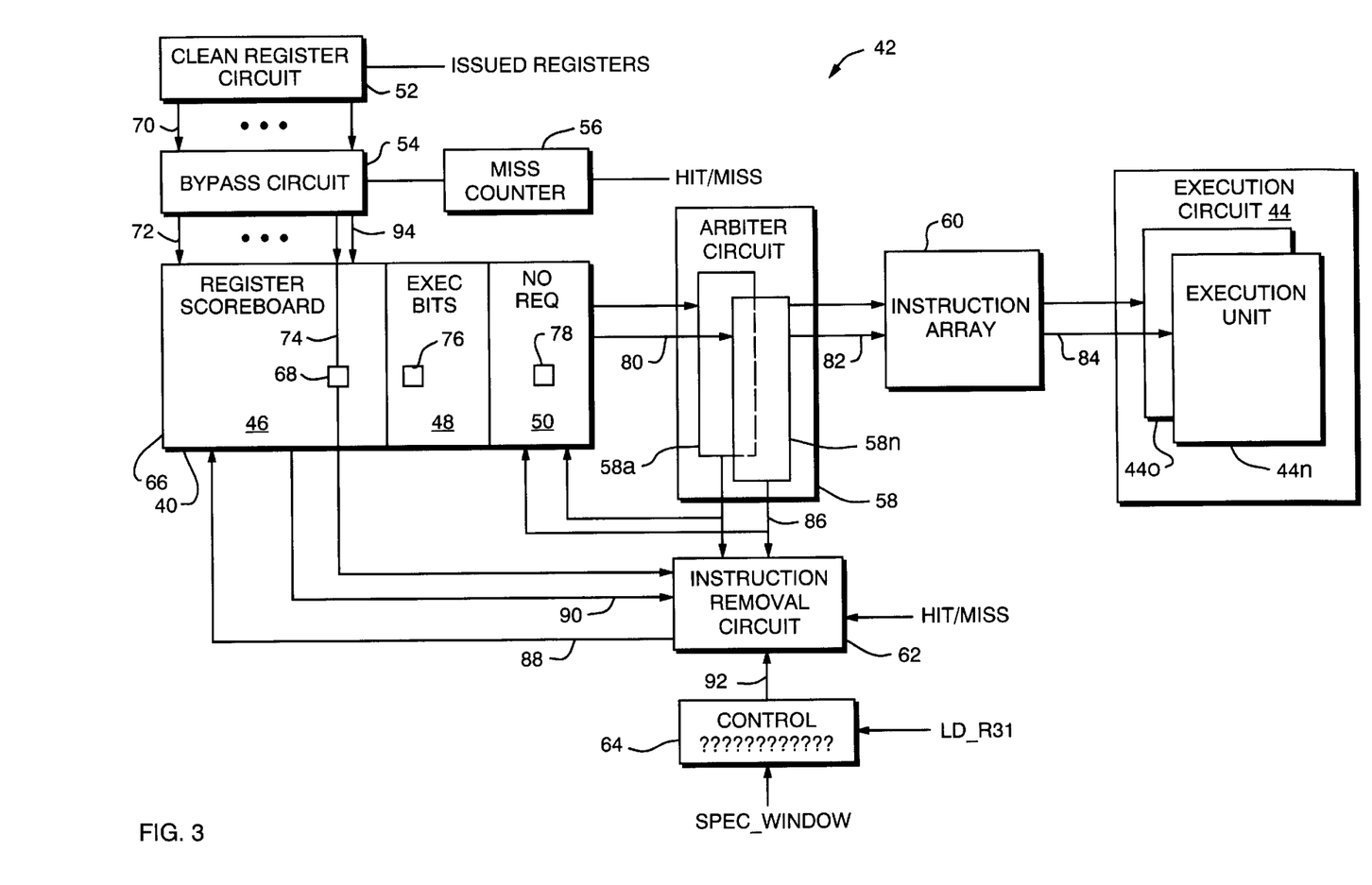
FIG. 3 is a block diagram of particular circuits within the pipeline that, under certain situations, reissue instructions that were issued during a speculative time window.

The pipeline 18 includes two pipeline circuits, an integer pipeline circuit that processes an integer instruction stream, and a floating point pipeline circuit that processes a floating point instruction stream. Each of these pipeline circuits is capable of issuing instructions within a speculative time window of a load instruction, and reissuing those instructions under certain situations. Each pipeline circuit includes circuitry as shown in FIG. 3.

First, the integer pipeline circuit will be discussed. As shown in FIG. 3, the integer pipeline circuit includes an issue queue 40, control circuitry 42 and an execution circuit 44. The issue queue 40 and the control circuitry 42 form a portion of the instruction issue/queue stage 26. The execution circuit 44 forms a portion of the instruction execution stage 30. The control circuitry 42 connects the issue queue 40 with the execution circuit 44.

The issue queue 40 includes a register scoreboard 46, execution bits 48, and no-request bits 50. The issue queue is divided into row entries (e.g., entry 66) for holding queued instructions. The register scoreboard 46 is divided into columns, each column having a line (e.g., line 74) that extends through each row entry (e.g., entry 66). Each row entry includes a bit (e.g., bit 68) for each column. These bits and columns correspond to physical integer GPRs of the processor. Each row entry (e.g., entry 66) further includes execution bits (e.g., bit 76) that correspond to execution units of the execution circuit 44, and a no-request bit (e.g., bit 78).

The control circuitry 42 includes a clean register circuit 52, a bypass circuit 54, and a miss counter 56. The bypass circuit 54 connects the clean register circuit 52 and the miss counter 56 with the issue queue 40.

The control circuitry 42 further includes an arbiter circuit 58, an instruction array 60, an instruction removal circuit 62, and a hardcoded memory control circuit 64. The instruction array 60 connects with the issue queue 40 through the arbiter circuit 58. The hardcoded memory control circuit 64 connects with the issue queue 40 through the instruction removal circuit 62.

The arbiter circuit 58 includes multiple arbiters $58_0$ through $58_N$. Each arbiter corresponds to an execution unit of the execution circuit 44. The execution circuit 44 includes multiple execution units $44_0$ through $44_N$. The execution units $44_0$ through $44_N$ can execute multiple instructions simultaneously.

The operation of the circuitry shown in FIG. 3 will now be described. The issue queue 40 queues integer stream instructions that were fetched earlier by the instruction fetch stage 20. In particular, the issue queue 40 stores the instructions in the row entries (e.g., entry 66). Preferably, the issue queue 40 is 20 rows deeps and holds up to 20 queued instructions. The issue queue 40 sets the scoreboard bits of each entry to indicate which GPRs are accessed by the instruction in that entry. For example, bit 68 corresponds to GPR28. If the instruction in entry 66 accesses GPR28, the issue queue 40 sets bit 68 of the scoreboard register 46. If the instruction in entry 66 is independent of GPR28, the issue queue 40 clears bit 68 of the scoreboard register 46.

The clean register circuit 52 sets lines 70 to indicate which GPRs are accessed by instructions in the process of being executed. That is, when an instruction is issued that writes to a particular register, the clear register circuit 52 sets a line 70 corresponding to that particular register to indicate that the particular register is in the process of being used. The signals on lines 70 are propagated through the bypass circuit 54 to the columns of the scoreboard register (e.g., line 74). For example, line 74 corresponds to GPR28. If GPR28 is in the process of being accessed by an issued instruction, line 74 is asserted. If there are no instructions in the process of accessing GPR28, line 74 is not asserted.

The issue queue 40 compares the scoreboard bits (e.g., bit 68) of each queued instruction (e.g., entry 66) and the columns (e.g., line 74). If there are matches between the scoreboard bits of a queued instruction and the columns (e.g., if bit 68 is set and line 74 is asserted), there is a conflict between the queued instruction and the GPRs. The instruction queue 40 waits until there are no conflicts for an instruction (e.g., bit 68 is set but line 74 is cleared) before allowing the instruction to issue.

The execution bits 48 of a queued instruction are preset by the instruction map stage 24 and indicate which execution unit is to execute the queued instruction. For example, bit 76 corresponds to execution unit $44_0$. Accordingly, if bit 76 is set, the queued instruction in entry 66 is assigned for execution on execution unit $44_0$.

The no-request bit 50 of a queued instruction indicates whether the queued instruction is allowed to arbitrate for execution. For example, if the bit 78 is set, the queued instruction in entry 66 cannot arbitrate for execution. However, if the bit 78 is clear, the queued instruction can arbitrate for execution.

The integer stream instructions of the issue queue 40 arbitrate for execution to the arbiter circuit 58 through lines 80. The arbiter circuit 58 includes individual arbiters $58_0$ through $58_N$ that correspond to execution units $44_0$ through $44_N$. Each arbiter selects an instruction assigned to that arbiter (and that arbiter's corresponding execution unit) and passes the selected instruction to the instruction array 60 through lines 82 where it is temporarily stored. Preferably, the issue queue 40 stores instructions in a bottom-up manner with the oldest instructions at the bottom of the issue queue 40 and the newest instructions at the top of the issue queue 40. As such, the arbiters preferably select the instructions that are closest to the bottom of the issue queue 40 for execution so that the older instructions have priority.

The instruction array 60 operates as a buffer and temporarily stores the instructions selected by the arbiter circuit 58. When the assigned execution circuit 44 is ready to execute a new instruction, the execution circuit retrieves an instruction from the instruction array 60 through one of the lines 84 and executes the retrieved instruction. If the instruction is a load instruction, the execution circuit 44 sends a hit/miss signal to the instruction removal circuit 62 indicating whether the load instruction resulted in a cache hit or a cache miss. The hit/miss signal also is sent to the miss counter 56.

The arbiter circuit 58 tells the issue queue 40 and the instruction removal circuit 62 which instruction was selected through lines 86. The issue queue 40 sets the no-request bits of the selected instructions to prevent the selected instruction from arbitrating again. The instruction removal circuit 62 determines which instructions were issued during a speculative time window of a load instruction by monitoring a speculative window signal received on line 92, and the hit/miss signal generated by the execution circuit 44. The speculative window signal also is generated by the execution circuit 44, and indicates whether the issued instructions were issued during a speculative time window of a load instruction. If an issued instruction was not issued during a speculative time window of a load instruction, the instruction removal circuit 62 removes the instruction from the issue queue 40 through line 88. If the issued instruction was issued during a speculative time window of a load instruction and the load instruction results in a cache hit, the instruction removal circuit 62 removes the instruction from the issue queue 40 through line 88. However, if the issued instruction was issued during a speculative time window of the load instruction and the load instruction results in a cache miss, the instruction removal circuit 62 keeps the instruction in the issue queue 40 through line 88.

Each issued instruction in the issue queue 40 is prevented from reissuing in the cycle following the cycle in which the instruction issued because the arbiter circuit 58 sets the no-request bit (e.g., bit 78) for that instruction. Then, the issued instruction will be removed by the instruction removal circuit 62 unless it was issued during a speculative time window of a load instruction that resulted in a cache miss. In the next cycle, the no-request bit is cleared, and the lines 70 from the clean register circuit 52 and the lines 72 from the bypass circuit 54 are updated. Accordingly, if the issued instruction is kept in the issue queue by the instruction removal circuit 62, it will be allowed to either reissue or prevented from reissuing due to conflicts. In particular, if no conflicts exists between the issued instruction and the physical GPRs, the instruction will be allowed to re-arbitrate. If a conflict exists (e.g., the issued instruction depends on a register that is being written to as a result of the cache miss) the issue queue 40 will prevent the issued instruction from issuing until the conflict is removed, i.e., until valid data is placed in the register and the appropriate lines (e.g., line 74) is deasserted.

A few optimizations to the circuits of FIG. 3 will now be described. The processor may include a predetermined memory location that has hardcoded data. Preferably, GPR31 is hardcoded with zeroes. When a load instruction accesses GPR31, execution of the load instruction is guaranteed to result in a cache hit. Accordingly, using a speculative time window for that instruction is unnecessary. The hardcoded memory control circuit 64 receives the speculative window signal from the execution unit and normally passes it through to the instruction removal circuit 62. However, when the hardcoded memory control circuit 64 receives a signal from the execution circuit 44 indicating that a load instruction is accessing GPR31, the hardcoded memory control circuit 64 prevents the speculative window signal from reaching the instruction removal circuit 62. Accordingly, the instruction removal circuit removes the instructions that issued during a speculative time window of the load instruction, and there is no possibility of reissuing those instructions. Hence, the speculative issue mechanism is effectively turned off for the load instruction accessing GPR31.

The speculative issue mechanism can be disabled in other ways as will now be explained. Cache misses often occur in groups. A miss counter 56 tracks the number of cache misses. If a predetermined number of misses occur (e.g., five) within a particular period of time, the miss counter 56 disables the speculative issue mechanism by instructing the bypass circuit 54 to maintain assertion of the lines 72 for extra cycles. This has the effect of prolonging conflicts in the issue queue 40. That is, the signals sent by the clean register circuit 52 through lines 70 are maintained for extra cycles so that queued dependent instructions waiting for GPRs that are in use are held until the speculative time windows expire. Accordingly, only independent instructions are allowed to issue during the speculative time windows, and reissuing instructions becomes unnecessary. Hence, the speculative issue mechanism can be turned off when there are high rates of cache misses.

Figure 4:
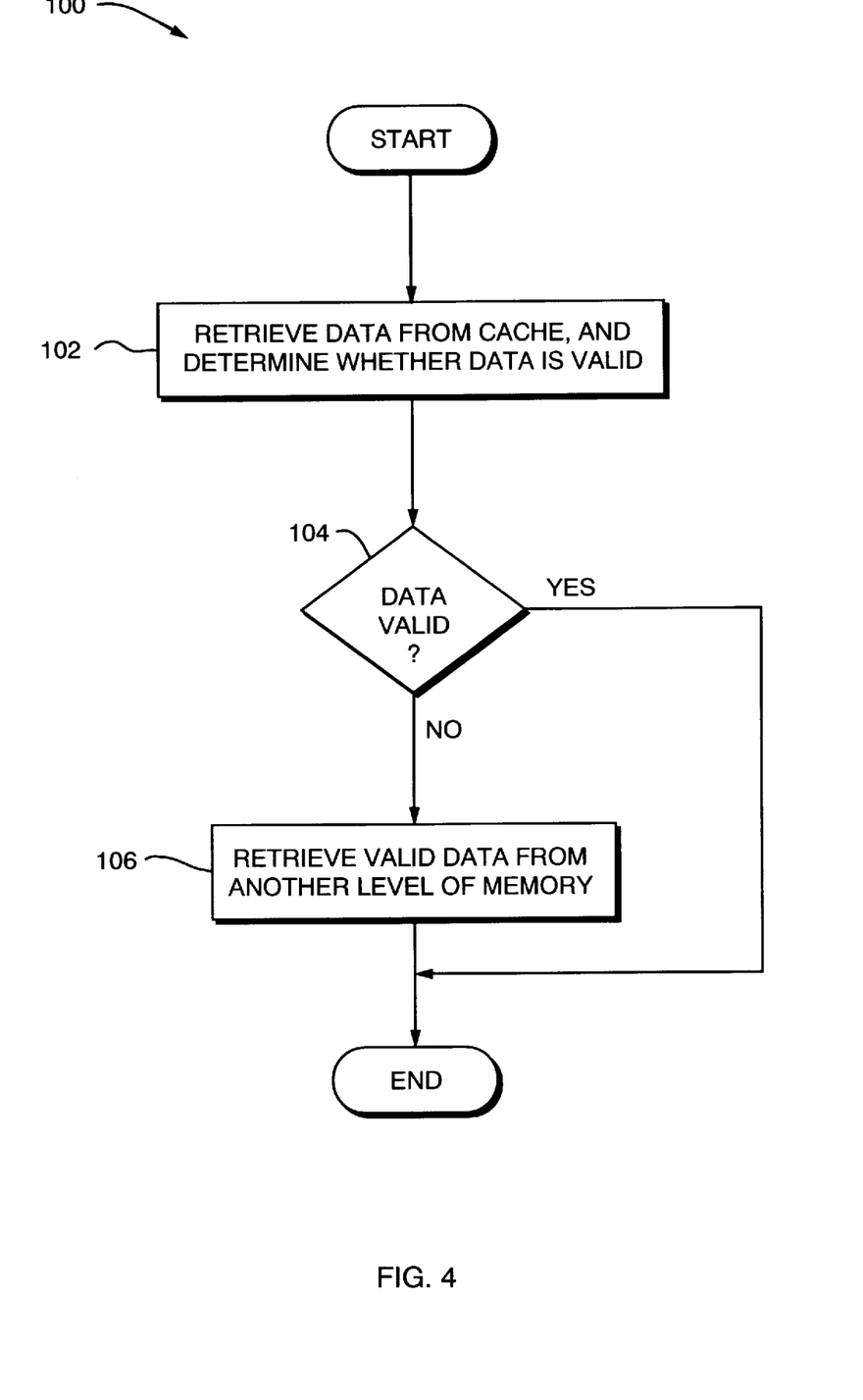
FIG. 4 is a flow diagram of a method for processing a load instruction performed by the pipeline shown in FIG. 1.

FIG. 4 is a flow diagram illustrating a method 100 for executing a load instruction that is performed by the execution circuit 44. In step 102, the execution circuit 44 retrieves data from a cache, and retrieves a tag indicating whether the data is valid. In step 104, the execution circuit 44 checks the retrieved tag to determine whether the data is valid. If the data is valid (a cache hit), the load instruction ends. If the data is invalid (a cache miss), step 104 proceeds to step 106. In step 106, the execution circuit 44 retrieves valid data from another level of memory. It is possible that the execution circuit 44 may need to access several memory levels before finally accessing memory that contains valid data.

Figure 5:
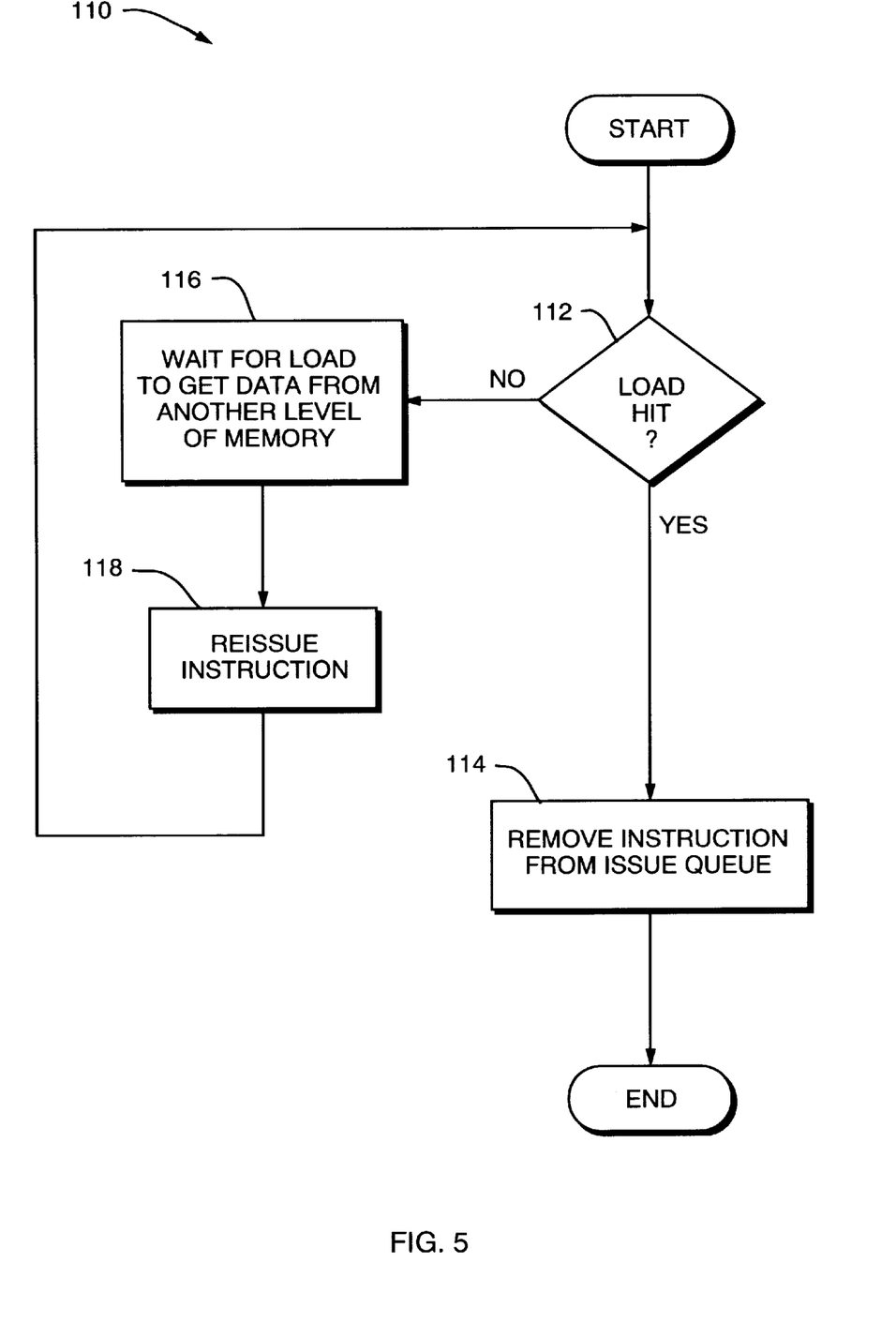
FIG. 5 is a flow diagram of a method for processing an integer instruction issued within a speculative time window of the load instruction processed by the method shown in FIG. 4.

FIG. 5 is a flow diagram illustrating a method 110 for handling an integer stream instruction within the speculative time window of a load instruction. The method is performed by the circuits shown in FIG. 3. In particular, in step 112, the execution circuit 44 determines whether the load instruction results in a cache hit or a cache miss. If the result is a cache hit the execution circuit 44 provides a hit/miss signal to the instruction removal circuit 62 indicating that a cache hit occurred, and step 112 proceeds to step 114. In step 114, the instruction removal circuit 62 removes the instruction from the issue queue 40, and the method 110 ends. If the result is a cache miss, the execution circuit 44 provides a hit/miss signal to the instruction removal circuit 62 indicating that a cache miss occurred, and step 112 proceeds to step 116. In step 116, the instruction removal circuit 62 maintains the instruction in the issue queue 40 until valid data is retrieved. In step 118, the issue queue 40 reissues the instruction, and step 118 loops back to step 112.

Figure 6:
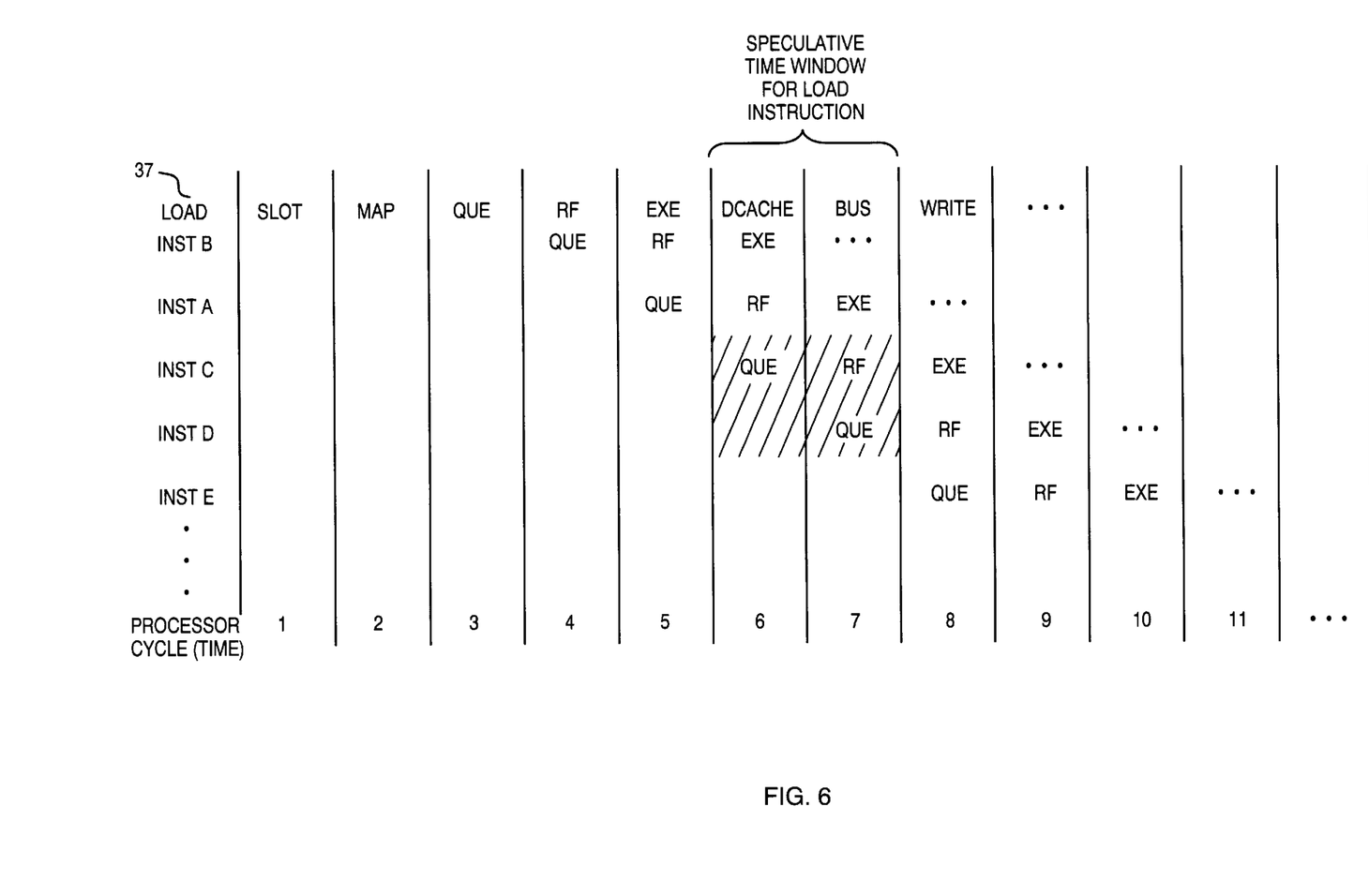
FIG. 6 is a timing diagram illustrating particular instructions that are processed by integer circuits of the pipeline shown in FIG. 1.

FIG. 6 shows, by way of example, multiple integer stream instructions that are processed simultaneously by the pipeline 18. In particular, the load instruction 37 (also see FIG. 1) issues in cycle 3, and executes during cycles 5–7. Instructions B, A, C, D and E are subsequently issued in that order, which is different from the program order for the instructions (see FIG. 1). In particular, instructions B and A occur earlier in program order than the load instruction 37, but are issued after the load instruction 37. Instructions B and A are issued before the speculative time window of the load instruction 37 (i.e., before cycles 6 and 7). Instructions C and D are issued during the speculative time window of the load instruction 37. Instruction C is independent of the load instruction 37 and occurs earlier in program order than the load instruction 37. Instruction D occurs after the load instruction 37 and depends on the load instruction 37. Instruction E is issued after the speculative time window of the load instruction 37.

If the load instruction 37 results in a cache hit, instructions C and D will execute properly. In particular, instruction D, which uses the data retrieved by the load instruction 37 executes in cycle 9 after the data is available (i.e., in cycle 8 or thereafter). If the load instruction 37 results in a cache miss, instructions C and D will be reissued.

The integer stream circuits shown in FIG. 3 are adapted to handle other speculative issue situations as well. In particular, suppose a single cycle instruction speculatively issues during a first cycle of a speculative time window of a load instruction, and that an instruction depending on the speculatively issued single cycle instruction is queued in the issue queue 40. Rather than delay issuing the queued instruction, the processor allows the queued instruction to arbitrate for execution. If the queued instruction is selected, the processor allows that instruction to issue speculatively in a second cycle of the speculative time window of the load instruction.

For example, in FIG. 6, suppose INST C is a single cycle instruction, and further suppose that INST C speculatively issues during a first cycle (cycle 6) of a speculative time window of the load instruction 37. If INST D is queued in the issue queue 40 and depends on INST C, the processor will allow INST D to arbitrate for execution, and if selected, will allow INST D to issue speculatively during a second cycle (cycle 7) of the speculative time window of the load instruction 37. The processor will complete execution of INST C and INST D if the load instruction 37 results in a cache hit. However, if the load instruction 37 results in a cache miss, the processor will reissue both INST C and INST D.

Having described the integer pipeline circuit, the floating point pipeline circuit will now be discussed with reference to FIG. 3. The floating point pipeline circuit includes an issue queue 40, control circuitry 42 and an execution circuit 44 that generally operate in a manner similar to that for the integer pipeline circuit. Preferably, the issue queue 40 for the floating point pipeline circuit is 15 rows deep and holds up to 15 queued floating point stream instructions. Instructions are speculatively issued during speculative time windows of load instructions. However, when a cache miss occurs, only truly dependent instructions issued during the speculative time window of that load instruction are reissued. Independent instructions issued during the speculative time window are not reissued. Rather, the independent instructions are deleted from the issue queue 40 as if they had issued outside the speculative time window.

The floating point pipeline circuit further includes lines 90 as shown in FIG. 3. Lines 90 provide the instruction removal circuit 62 with an indication of whether the instructions are dependent and issued within a speculative window of a load instruction. If an issued instruction is independent or not issued within a speculative window of a load instruction, the instruction removal circuit 62 removes that instruction from the issue queue 40 through lines 88. If the instruction is dependent on a load instruction and speculatively issues during a speculative window of the load instruction, the instruction removal circuit 62 only removes the dependent instruction if the load instruction results in a cache hit based on the hit/miss signal. If the load instruction results in a cache miss, the instruction removal circuit keeps the dependent instruction in the issue queue 40 so that it reissues once valid data is retrieved.

It should be understood that optimizations for the integer stream circuit can be incorporated in the floating point circuit as well. For example, the speculative issue mechanism can be turned off for loads to predetermined registers such as a floating point GPR31. The hardcoded memory control circuit 64 blocks the speculative window signal in a manner similar to that for the integer instruction stream to effectively turn off the mechanism. Furthermore, the speculative issue mechanism can be disabled when a high rate of cache misses occur. Here, the miss counter 56 controls the bypass circuit 54 in a manner similar to that for the integer instruction stream to delay issuance of dependent instructions until after the speculative time windows pass.

Figure 7:
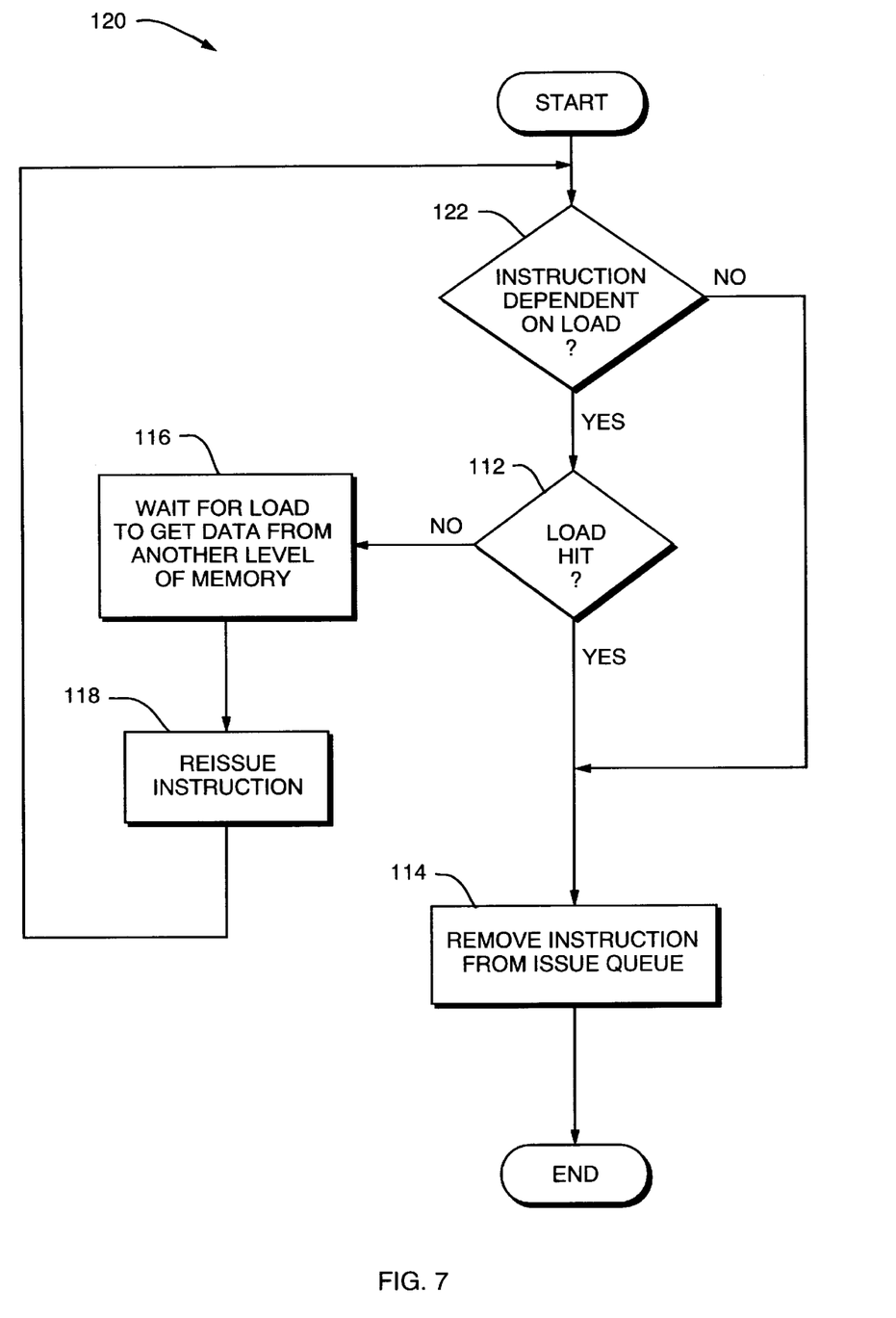
FIG. 7 is a flow diagram of a method for processing a floating point instruction issued within a speculative time window of the load instruction processed by the method shown in FIG. 4.

FIG. 7 is a flow diagram illustrating a method 120 for handling a floating point stream instruction within the speculative time window of a load instruction. The method is similar to that for integer stream instructions except that it includes an additional step 122. In step 122, the instruction removal circuit 62 checks the lines 90 to determined whether the instruction issued during a speculative time window of a load instruction is dependent on that load instruction. If the instruction is independent, step 122 proceeds to step 114 so that the instruction removal circuit 62 removes the instruction from the issue queue 40. If the instruction is dependent, step 122 proceeds to step 112 which determines whether the load instruction results in a cache hit or cache miss, and the method proceeds in a manner similar to that of method 110. In particular, the instruction will be removed from the instruction queue 40 if the load instruction results in a cache hit, or left in the instruction queue 40 to be reissued if the load instruction results in a cache miss.

Figure 8:
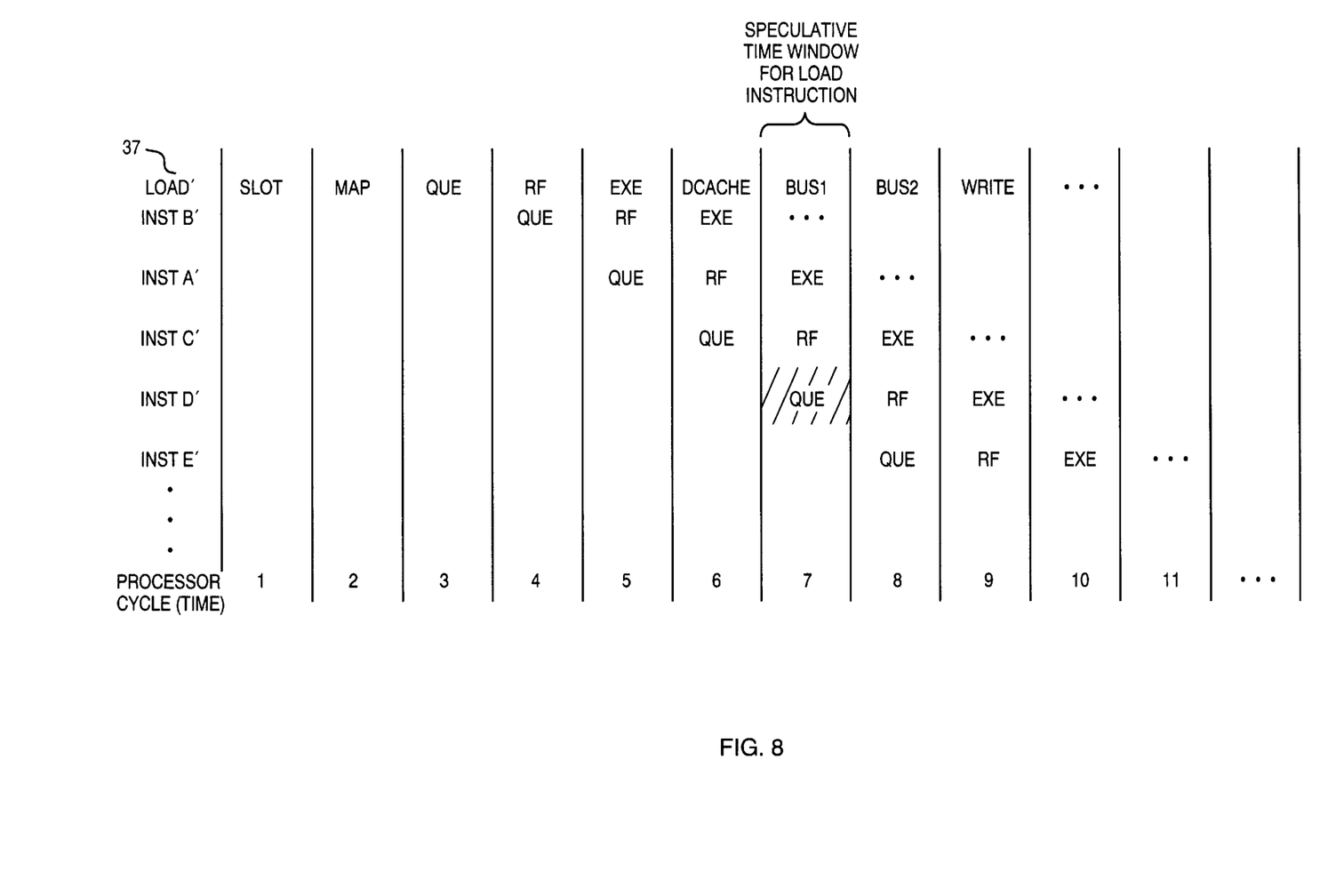
FIG. 8 is a pipeline timing diagram illustrating particular instructions that are processed by floating point circuits of the pipeline shown in FIG. 1.

FIG. 8 shows multiple floating point stream instructions that are processed simultaneously by the pipeline 18. In particular, a floating point load instruction LOAD' issues in cycle 3, and executes during cycles 5–8. The floating point load instruction LOAD' differs from the integer load instruction LOAD (see FIG. 6) in that the load instruction LOAD' executes in four cycles (cycles 5–8) rather than three. Accordingly, the speculative time window for the floating point load instruction LOAD' is only one cycle long (cycle 7). If a dependent instruction were issued during cycle 6, it would need to wait until cycle 9 before executing because the data would not be available sooner. Accordingly, the issue queue 40 would not issue a dependent instruction until cycle 7. Instructions B', A', C', D' and E' are issued after the load instruction LOAD' in that order, which is different than the program order for the instructions (see FIG. 1). In particular, instructions B', A' and C' occur earlier in program order than the load instruction LOAD, but are issued after the load instruction LOAD and before the speculative time window of the load instruction LOAD (i.e., before cycle 7). Instruction D' is issued speculatively during the speculative time window of the load instruction LOAD'. Instruction E' is issued after the speculative time window of the load instruction LOAD'.

If the load instruction LOAD' results in a cache hit or if instruction D' is independent of the load instruction LOAD', instruction D' will execute properly and be removed from the issue queue. If the load instruction LOAD' results in a cache miss and instruction D' depends on the load instruction LOAD', instruction D' will be reissued.

It should be understood that even though the speculative time windows for load instructions of the floating point instruction stream are one cycle in length multiple instructions can be speculatively issued within these windows. In particular, the arbiter circuit 58 (see FIG. 3) includes multiple arbiters and the execution circuit includes multiple execution units that operate concurrently. Accordingly, multiple instructions can be speculatively issued during the same cycle.

Figure 9:
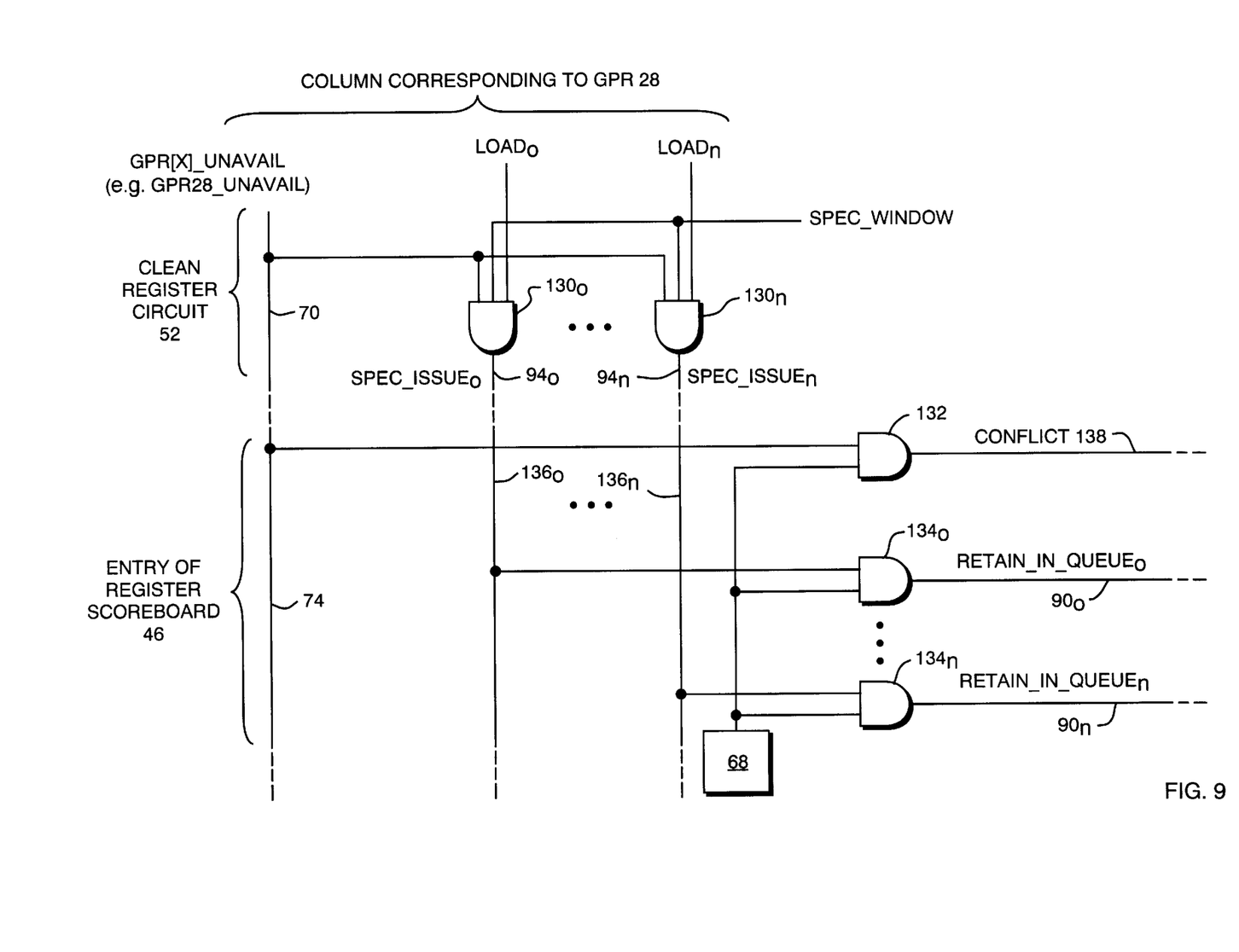
FIG. 9 is a detailed circuit diagram of particular circuitry shown in FIG. 3 that generates issue queue signals.

Further details of the circuitry that generates the signals on lines 80 for the integer and floating point pipeline circuits will now be discussed with reference to FIGS. 3 and 9. As described earlier, the clean register circuit 46 provides signals on lines 70 (passed through the bypass circuit 54 to lines 72, see FIG. 3) indicating whether load instructions have issued but not completed executing that write to GPRs of the processor. These signals are named GPR[X]_UNAVAIL, X being the GPR register number. Each column of the register scoreboard 46 receives one of these signals so that the entries of the register scoreboard 46 (e.g., entry 66) can determine whether conflicts exist between issued instructions and queued instructions. For example, as shown in FIG. 9, for the column corresponding to GPR28, the clean register circuit 52 provides GPR28 UNAVAIL indicating whether a load instruction has issued but not completed executing that writes to GPR28. This signal is carried along line 74 to each entry of the register scoreboard 46. Bit 68 of entry 66, which indicates whether the instruction in entry 66 accesses GPR28, is matched with the signal GPR28_UNAVAIL using hardware logic that performs a logical AND operation 132 to determine whether a conflict over GPR28 exists between the instruction in entry 66 and an issued instruction that has not completed execution. The output (line 138) of the logical AND operation 132 is a signal CONFLICT which is asserted if a conflict over GPR28 exists, or not asserted if no conflict exists. When no conflict exists for each GPR (i.e., for each column) of an entry, the instruction in that entry is allowed to arbitrate for execution on one of the lines 80 (see FIG. 3). The column circuitry described above is used in each column for both the integer pipeline circuit and the floating point pipeline circuit.

The floating point pipeline circuit further includes additional column circuitry to generate the signals on lines 90 as will now be discussed with reference to FIGS. 3 and 9. The clean register circuit 52 further includes hardware logic that generates signals (SPEC_ISSUE$_0$ through SPEC_ISSUE$_N$) on lines 94 indicating occurrences of speculative time windows for issued load instructions. In particular, for each floating point GPR, the hardware logic of the clean register circuit 52 performs logical AND operations $130_0$ through $130_N$ for the execution units $44_0$ through $44_N$. The signals SPEC_ISSUE$_0$ through SPEC_ISSUE$_N$ generated by the logical AND operations $130_0$ through $130_N$ indicate whether a speculative time window occurs for a load instruction in one of the execution units. For example, for the column corresponding to floating point GPR28, a logical AND operation $130_0$ generates the signal SPEC_ISSUE$_0$ indicating whether a speculative time window occurs for a load instruction that writes to GPR28 executing in execution unit $44_0$. For each column, the inputs to each logical AND operation are the signal GPR[X]_UNAVAIL (e.g., GPR28_UNAVAIL), the speculative window signal, and a signal $LOAD_X$ (e.g., $LOAD_0$) indicating whether an issued load instruction writing to the GPR corresponding to that column is executing in execution unit $44_x$ (e.g., execution unit $44_0$).

Each column of the register scoreboard 46 receives the signals $SPEC\_ISSUE_0$ through $SPEC\_ISSUE_N$ corresponding to that column's floating point GPR. Each entry (e.g., entry 66) of the register scoreboard 46 includes hardware logic that matches these signals with the register bits of that entry (e.g., bit 68). In particular, logical AND operations $134_0$ through $134_N$ for each bit of each entry generate signals $RETAIN\_IN\_QUEUE_0$ through $RETAIN\_IN\_QUEUE_N$ for that entry. A match in an entry (i.e., assertion of one of the generated signals) indicates that a speculative time window of a load instruction is occurring and the instruction in that entry depends on that load instruction. For example, for the column that corresponds to floating point GPR28, the logical AND operations $134_0$ through $134_N$ of the entry 66 match the signals $SPEC\ ISSUE_0$ through $SPEC\_ISSUE_N$ with the bit 68. If one of logical AND operations $134_0$ through $134_N$ generates a match, a speculative time window of a load instruction that writes to floating point GPR28 is occurring and the instruction in entry 66 is a dependent instruction of that load instruction.

For issued instructions in the issue queue 40, the signals $RETAIN\_IN\_QUEUE_0$ through $RETAIN\_IN\_QUEUE_N$ are sent to the instruction removal unit 62 through lines 90 to instruct the instruction removal unit 62 to either remove the issued instruction from the issue queue 40 or retain the issued instruction. For example, for the instruction in entry 66, if one of the signals $RETAIN\_IN\_QUEUE_0$ through $RETAIN\_IN\_QUEUE_N$ is asserted, the instruction removal unit 62 will retain the instruction in the issue queue 40 because the asserted signal indicates that the instruction is a dependent instruction issued during a speculative time window of a load instruction. Otherwise, the instruction removal unit removes the instruction from the issue queue 40.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the integer instruction stream circuits can be modified so that only truly dependent instructions are reissued in response to a cache miss in a manner similar to that for the floating point instruction stream. That is, the circuits reissue only dependent instructions rather than all instructions that were speculatively issued.

Furthermore, the processor can include a control register that expressly enables and disables the speculative issue mechanism when loaded with particular instructions. Additionally, the processor can be programmed so that the speculative issue mechanism turns on or turns off in response to particular situations.

Additionally, it should be understood that there are other reasons for issuing instructions out of order other than those described above. The mechanisms of the invention can be combined with other out of order issue mechanisms so that instructions can be issued out of order for multiple reasons.

What is claimed is:

1. A method for processing instructions in a data processor in which instructions may be issued out of program order, the method comprising the steps of:

issuing and executing a first instruction;

initiating issuance of a second instruction during a speculative time window of the first instruction, the speculative time window occurring after the first instruction is issued;

executing the issued second instruction when the first instruction is executed in a first manner;

reissuing the second instruction and executing the reissued second instruction when the first instruction is executed in a second manner which is different than the first manner;

identifying an occurrence of at least one cache miss when multiple load instructions are executed;

issuing and executing a load instruction after an occurrence of at least one cache miss is identified;

delaying issuance of a dependent instruction during a speculative time window of the first load instruction, when the dependent instruction depends on the instruction; and issuing the dependent instruction after the speculative time window of the load instruction has elapsed, and executing the issued dependent instruction.

2. The method of claim 1, wherein the second instruction occurs earlier in program order than the first instruction.

3. The method of claim 1, further comprising the steps of:

issuing a third instruction during the speculative time window of the first instruction;

executing the third instruction when the first instruction does not result in a cache miss; and reissuing the third instruction and executing the reissued third instruction when the first instruction results in a cache miss.

4. The method of claim 3 wherein the speculative time window of the first instruction is multiple processor cycles in length, and wherein the third instruction is issued during a different processor cycle of the speculative time window of the first instruction than that of the second instruction.

5. The method of claim 1, wherein the speculative time window of the first instruction begins at least one processor cycle after the first instruction is issued, and further comprising the step of:

issuing a third instruction after the first instruction is issued and before the speculative time window of the first instruction begins, and executing the issued third instruction.

6. The method of claim 1, further comprising the steps of:

issuing and executing a third instruction that accesses a memory location that includes hardcoded data;

issuing a fourth instruction during a speculative time window of the third instruction; and executing the issued fourth instruction.

7. A method as in claim 1 additionally comprising the steps of:

counting a number of cache miss occurrences; and delaying issuance of the second instruction during the speculative time window only when the number of cache miss occurrences does not exceed a predetermined amount.

8. A method for processing instructions in a data processor, the method comprising the steps of:

issuing and executing a first instruction;

issuing a second instruction during a speculative time window of the first instruction that occurs after the first instruction is issued;

executing the issued second instruction when the second instruction is independent of the first instruction, or when the first instruction is executed in a first manner;

reissuing the second instruction and executing the reissued second instruction when the second instruction depends on the first instruction, and when the first instruction is executed in a second manner that is different than the first manner identifying an occurrence of multiple cache misses when multiple load instructions are executed;

issuing and executing a particular load instruction after the multiple cache miss occurrence is identified;

delaying issuance of a dependent instruction during a speculative time window of the particular load instruction, the dependent instruction depending on the particular load instruction; and issuing the dependent instruction after the speculative time window of the particular load instruction has elapsed, and executing the issued dependent instruction.

9. The method of claim 8, wherein the step of issuing and executing the particular load instruction includes the steps of:

retrieving valid data from a cache to execute the particular load instruction in a first manner; and retrieving invalid data from the cache, and subsequently retrieving valid data from a level of memory other than the cache to execute the particular load instruction in a second manner, the dependent instruction occurring later in program order than the particular load instruction, and depending on the retrieved valid data.

10. The method of claim 8, wherein the dependent instruction occurs earlier in program order than the particular load instruction.

11. The method of claim 8, further comprising the steps of:

issuing a third instruction during the speculative time window of the particular load instruction;

executing the third instruction when the particular load instruction is executed in a first manner; and reissuing the third instruction and executing the reissued third instruction when the particular load instruction is executed in a second manner.

12. The method of claim 11, wherein the speculative time window of the particular load instruction is a single processor cycle in length, and wherein the dependent instruction and the third instruction are issued during the single processor cycle of the speculative time window of the particular load instruction.

13. The method of claim 8, wherein the speculative time window of the particular load instruction begins at least one processor cycle after the particular load instruction is issued, and further comprising the step of:

issuing a third instruction after the particular load instruction is issued and before the speculative time window of the particular load instruction begins, and executing the issued third instruction.

14. The method of claim 8, further comprising the steps of:

issuing and executing a particular load instruction that accesses a memory location that includes hardcoded data;

issuing a third instruction during a speculative time window of the particular load instruction; and executing the issued third instruction.

15. A data processor for processing instructions, in which instructions may be issued out of program order, the data processor comprising:

an issue queue that issues a first instruction, and issues a second instruction during a speculative time window of the first instruction that occurs after the first instruction is issued;

control circuitry that executes the first instruction; executes the issued second instruction when the first instruction is executed in a first manner; and reissues the second instruction and executes the reissued second instruction when the first instruction is executed in a second maimer that is different than the first manner;

the control circuitry being further adapted to:

identify an occurrence of at least one cache miss when multiple load instructions are executed;

issue and execute a load instruction after the at least one cache miss occurrence is identified;

delay issuance of a dependent instruction during a speculative time window of the load instruction, the dependent instruction depending on the load instruction; and issue the dependent instruction after the speculative time window of the load instruction has elapsed, and execute the issued dependent instruction.

16. The data processor of claim 15, wherein the control circuitry is further adapted to:

issue and execute a third instruction that accesses a memory location that includes hardcoded data, issue a fourth instruction during a speculative time window or the second instruction, and execute the issued fourth instruction.

17. A data processor for processing instructions, comprising:

an issue queue that issues a first instruction, and issues a second instruction during a speculative time window of the first instruction that occurs after the first instruction is issued;

control circuitry that:

executes the first instruction;

executes the issued second instruction when the second instruction is independent of the first instruction, or when the first instruction is executed in a first manner;

reissues the second instruction and executes the reissued second instruction when the second instruction depends on the first instruction, and when the first instruction is executed in a second manner that is different than the first manner:

wherein the control circuitry is further adapted to:

identify an occurrence of multiple cache misses when multiple load instructions are executed;

issue and execute a load instruction after the multiple cache miss occurrences are identified; and delay issuance of a dependent instruction during a speculative time window of the load instruction, the dependent instruction depending on at least one of the multiple load instructions causing the multiple cache miss occurrences; and issue the dependent instruction after the speculative time window of the at least one load instruction has elapsed, and execute the issued dependent instruction.

18. The data processor of claim 17, wherein the control circuitry is adapted to issue and execute a third instruction that accesses a memory location that includes hardcoded data, issue a fourth instruction during a speculative time window of the third instruction, and execute the issued fourth instruction.

* * * * *

UNITED STATES PATENT AND TRADEMARK OFFICE
CERTIFICATE OF CORRECTION

PATENT NO. : 6,098,166
DATED : August 1, 2000
INVENTOR(S) : James Arthur Farrell, Timothy Charles Fischer, Daniel Lawrence Leibholz, Sven Eric Meier and Derrick Robert Meyer

It is certified that error appears in the above-identified patent and that said Letters Patent is hereby corrected as shown below:

Claim 15, Column 16, line 22 reads: "second maimer" ....
It should read ---second manner---.........

Signed and Sealed this

Seventeenth Day of April, 2001

*Attest:*

NICHOLAS P. GODICI

*Attesting Officer*       Acting Director of the United States Patent and Trademark Office